(12) United States Patent
Kubota et al.

(10) Patent No.: US 7,068,268 B2
(45) Date of Patent: Jun. 27, 2006

(54) COMPUTER-AIDED PRODUCT DESIGN SYSTEM

(75) Inventors: Nagomu Kubota, Wako (JP); Hiromi Shimada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 207 days.

(21) Appl. No.: 10/190,479

(22) Filed: Jul. 9, 2002

(65) Prior Publication Data

US 2003/0014228 A1    Jan. 16, 2003

(30) Foreign Application Priority Data

Jul. 10, 2001    (JP) .............................. 2001-208857

(51) Int. Cl.
*G06T 15/00*    (2006.01)

(52) U.S. Cl. ..................... 345/419; 345/473; 700/96; 700/97; 700/98; 700/182

(58) Field of Classification Search ................ 345/419, 345/420, 964; 703/7–8; 700/118, 182, 197
See application file for complete search history.

(56) References Cited

U.S. PATENT DOCUMENTS

| | | | | |
|---|---|---|---|---|
| 5,812,402 | A | | 9/1998 | Nishiyama et al. .... 364/468.03 |
| 6,021,270 | A | * | 2/2000 | Hanaki et al. ................. 703/7 |
| 6,120,171 | A | * | 9/2000 | Shaikh ......................... 700/98 |
| 6,233,499 | B1 | * | 5/2001 | Matsumoto .................. 700/197 |
| 6,862,023 | B1 | * | 3/2005 | Shaikh ......................... 345/420 |

FOREIGN PATENT DOCUMENTS

| | | |
|---|---|---|
| JP | 9-319772 | 12/1997 |
| JP | 11-306224 | 11/1999 |

OTHER PUBLICATIONS

Jefferis et al., "AutoCAD for Architecture R13", 1997, Autodesk Press, Chapters 7 and 12.*

(Continued)

*Primary Examiner*—Ulka Chauhan
*Assistant Examiner*—Enrique L. Santiago
(74) *Attorney, Agent, or Firm*—Arent Fox, PLLC.

(57) ABSTRACT

In a product design system having a computer and an interactive program stored in the computer for aiding the engineer to design a product and including product design process for allowing the engineer to design a product model and mold design process to design a mold for producing the product based on the designed product model, the program is rewritten such that a virtual boundary line is determined between a portion of surface and rest of the geometric model, when a shape of the portion of surface of the geometric model is to be changed, an area extending to the virtual boundary line is determined as the portion of surface whose shape is to be changed; and the shape of the portion is changed using a definition of shape of the portion. With this, a portion of a geometric model such as a solid model, once completed, can be easily changed with the use of the definition of shape already obtained before the change is made, thereby improving the efficiency of product design.

24 Claims, 12 Drawing Sheets

OTHER PUBLICATIONS

Article "Assembly Design puts the parts together" by John MacKrell, Computer-Aided Engineering; Oct. 1997, vol. 16 Issue 10.*

European Search Report dated Sep. 29, 2004 for EP 28458P.

"Making Complete Surface Hypotheses," Fisher, From Surfaces to Objects—Computer Vision and Three Dimensional Scene Analysis, *John Wiley and Sons*, XP002295017, pp. 57-69 (1989).

"Extensions: Extrapolation Methods for CAD," Wolters, HPL-2000-37, Online!, *HP Laboratories Palo Alto*, XP002294665, pp. 1-10, Mar., 2000.

* cited by examiner

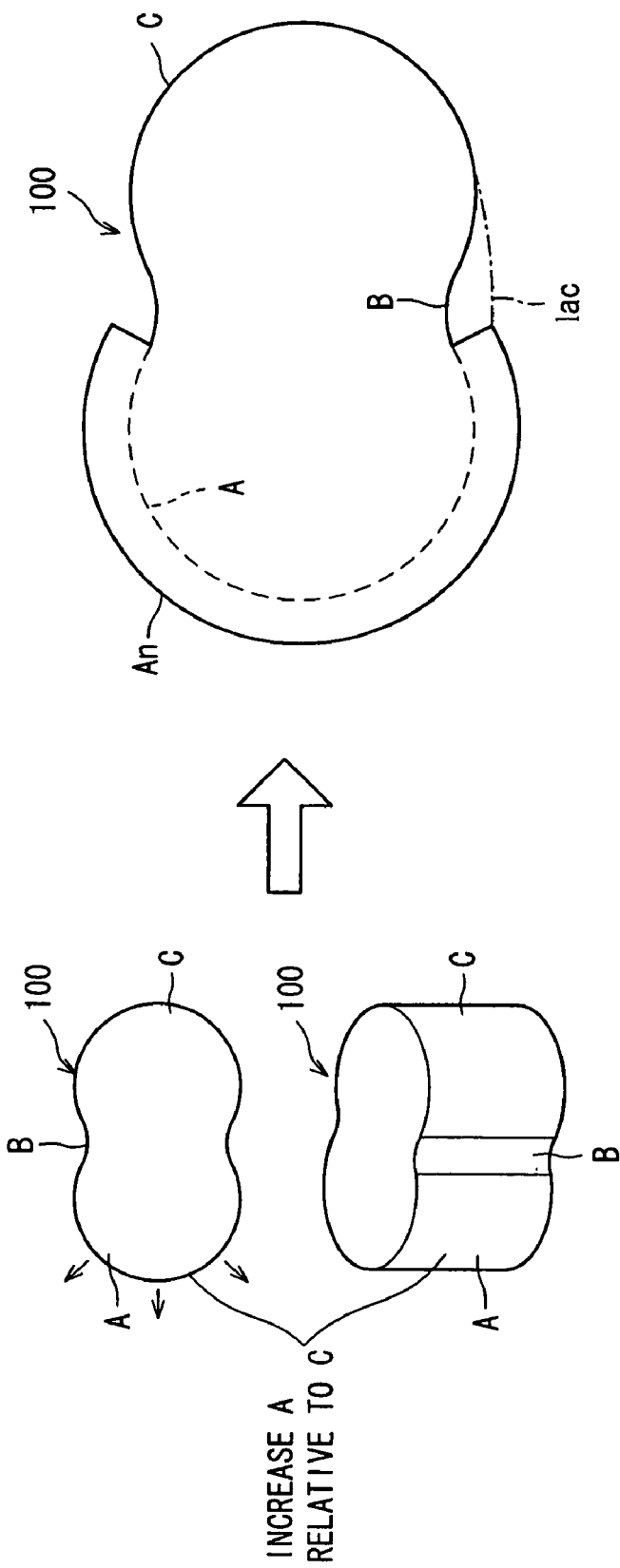

COMPUTER-AIDED PRODUCT DESIGN SYSTEM

BACKGROUND OF THE INVENTION

1. Field of the Invention

This invention relates to a computer-aided product design system, more specifically, a product design system constituted as the so-called CAD (computer-aided design)/CAM (computer-aided manufacturing), CIM (computer-integrated manufacturing) and other product design systems.

2. Description of the Related Art

The technology taught by Japanese Laid-Open Patent Application Hei 9-319,772 can be given as an example of this kind of computer-aided product design system. In this prior-art, the features of the product shape are determined in the preceding product design process, thus facilitating automated design of the upper mold shape in the mold design process in the subsequent process, whereby shortening of the period of time to design in both processes is possible.

In CAD/CAM or CIM, when molds are used to manufacture products, the designer (engineer) normally uses a CAD system to first make or design a product model or product shape from a geometric model such as a solid model obtained by sweeping a primitive (a basic elements such as a circular cylinder, a cube) on the screen to conduct Boolean set operations to combine the primitives and the product model is then used to make or design a mold model in the mold design process. Next, this mold model is used to make mold fabrication data, after which the mold is fabricated by CNC (computer numerical control) fabrication, etc., using the data, and the fabricated mold is used to make the product by casting or cutting.

In this way, the shape of the product model constructed in the product design process determines the shape of the product, and therefore the release draft, i.e., the release draft for releasing the product from the mold required for the casting process, must be added to the product model in the product design process. A rounded portion referred to as a fillet is applied or formed on a square edge in this product model. Specifically, the product model is edited such that portions where two lines or curves intersect continue smoothly with a circular arc (fillet) having designated or specified radius of curvature.

After the geometric model such as the solid model has been completed to a desired shape with surfaces adjoined tangentially continuous by a fillet, there may be a need to change a portion of the model shape for a reason that the release draft is insufficient or the thickness is to be changed. In the prior art product design process using CAD/CAM or CIM, however, once the model has been completed, it has been impossible to change a portion of the model while maintaining the surfaces adjoined to be tangentially continuous, in other words, it is impossible to change a portion of the model while enabling to use the definition of shape before change.

Even in the prior art, it is possible to change the color of surfaces ('adjoined to be tangentially continuous by fillets) in the model to be different from each other as illustrated in FIG. 13. It should be noted here that the difference of colors are expressed by the difference in lines or hatching. It is also possible, even in the prior art, to extract or separate the surface element (face) from the model as illustrated in FIG. 14. Even in the prior art, thus, it is possible to recognize the boundary adjoining the surfaces. However, in the prior art, it is not possible to change a shape of the model while enabling to use the definition of shape obtained before the shape has been changed.

This will be specifically explained with reference to FIG. 15. In a solid model of a circular cylinder having a rounded side surface indicated by A, B, C, suppose that A and C are adjoined by a fillet B, in other words, A, B and C are not independent from each-other and hence, A is a portion of surface. In the illustrated example, if A is to be increased (changed) to An, since a step (level difference) arises between An and C, a line lac connecting An and C must be drawn from the edge (immediately before the step), which makes it impossible to use the definition of shape before change and is restrictive. Needless to say, if the definition of shape for An is newly calculated (i.e., data after change), the line lac will be easily drawn by using the new data for An together with the original data for C. However, re-calculation of the definition of shape is tedious and degrades the efficiency of product design.

SUMMARY OF THE INVENTION

Therefore, an object of the invention is to resolve the problem described above by providing a computer-aided product design system in which a portion of a geometric model such as a solid model, once completed, can be easily changed with the use of the definition of shape before change, thereby improving the efficiency of product design.

In order to achieved these objects, the invention provides a system for designing a product having at least a computer, a display connected to the computer for displaying result of processing of the computer, an input device connected to the computer for allowing an engineer to enter data and an interactive program, stored in the computer, for aiding the engineer to design the product through the display and the input device, the program having a shape modelling function and including at least: product design process for allowing the engineer to design a product model by modelling the product by a geometric model comprising a combination of basic elements through the shape modelling function; and mold design process for allowing the engineer to design a mold for producing the product based on the designed product model; In the system, the program of the product design process comprising; virtual boundary line determining means for determining a virtual boundary line between a portion of surface and rest of the geometric model, when a shape of the portion of surface of the geometric model is to be changed; area determining means for determining an area extending to the virtual boundary line as the portion of surface whose shape is to be changed; and shape changing means for changing the shape of the portion using a definition of shape of the portion.

BRIEF DESCRIPTION OF THE DRAWINGS

These and other objects and advantages of the invention will be more apparent from the following description and drawings, in which:

FIG. 15 is an explanatory view similarly showing the operation of a product design system of the prior art.

DETAILED DESCRIPTION OF THE PREFERRED EMBODIMENTS

Embodiments of the computer-aided product design system of the invention are described below by referring to the attached drawings.

Figure 1:
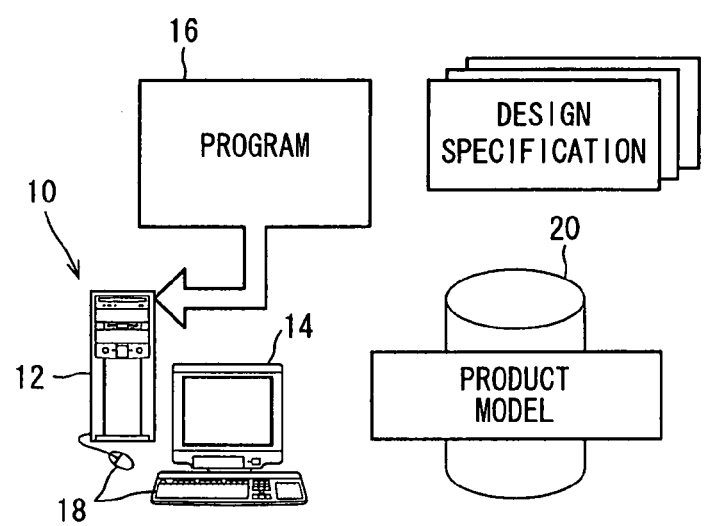
FIG. 1 is a schematic view showing the overall configuration of a computer-aided product design system according to an embodiment of the invention.

FIG. 1 is a schematic diagram showing the overall configuration of a computer-aided product design system according to a first embodiment of the invention. In the figure, reference numeral 10 indicates the product design system which comprises a computer 12, a display 14 connected to the computer 12 for displaying the result of processing and an interactive program 16 (stored in the computer 12) that realizes a shape modeling function by means of 3-dimensional curves and 3-dimensional surfaces via the output displayed on the display 14. Further, the product design system 10 is equipped with a group of input devices including a keyboard, a mouse, etc., and generally assigned with reference numeral 18.

With this, the engineer enters data via the input device 18 based on a design specification that describes the required product (part) specification, whereby the product model is designed interactively by following the instructions stored in the program 16.

The product is expressed in the program 16 as a geometric model, more specifically, a solid model, whose shape including vertexes, edges, etc., is defined by numerical datal. The design is conducted in such a way that the engineer (designer) sweeps basic elements (primitives) such as circular cylinders displayed on the display 14 and conducts Boolean set operations comprising a sum set, a difference set and a product set to combine the basic elements so as to prepare the solid model, and based on the solid model, prepare or design the product model (now assigned with reference numeral 20). Thus, the product design system is constituted as the CAD/CAM or CIM.

Figure 2:
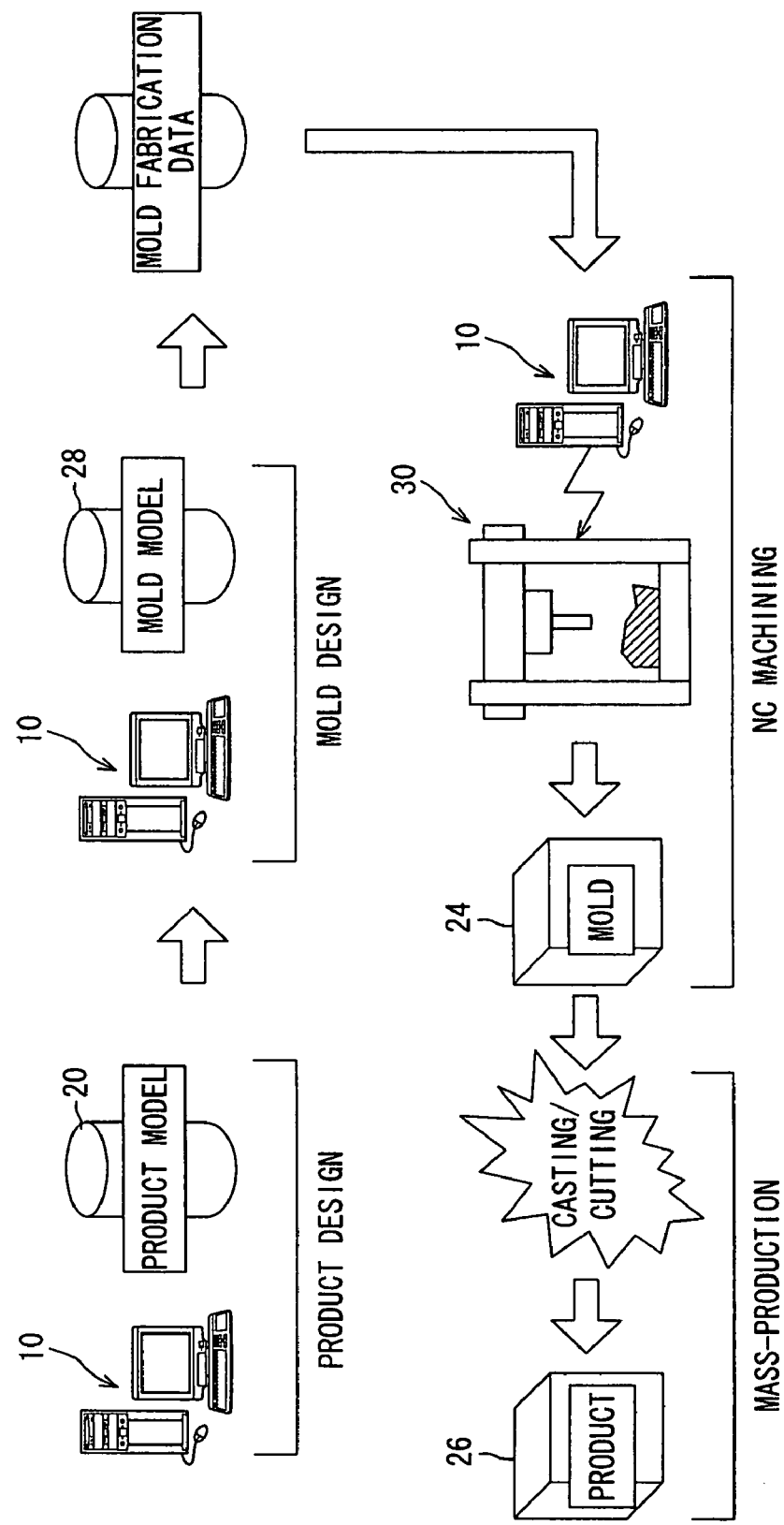
FIG. 2 is an explanatory view showing the process from product design to mass-production performed using the system illustrated in FIG. 1.

FIG. 2 is an explanatory view for explaining the process from product design and to mass-production performed using this product design system 10.

As explained above, in CAD/CAM or CIM, when a mold 24 is used to manufacture a product 26, the engineer normally uses this product design system 10 to make or design the product model 20 in the product design process, and the product model 20 is used to make or design a mold model 28 in the mold design process.

Next, the engineer uses the mold model 28 to prepare mold fabrication data which is then used to fabricate the mold 24 by means of an NC machining apparatus 30, etc., and the fabricated mold 24 is used to make the product 26 through casting or cutting (finishing).

Thus, the system 10 has at least the computer 12, the display 14 connected to the computer for displaying result of processing of the computer, the input device 18 connected to the computer for allowing the engineer to enter data in accordance with the required specification of the product and the interactive program 16, stored in the computer, for aiding the engineer to design the product through the display and the input device, which has a shape modelling function realized by 3-dimensional curves and surfaces and including at least the product design process for allowing the engineer to design the product model 20 by modelling the product through the shape modelling function and the mold design process for allowing the engineer to design the mold 24 for producing the product based on the designed product model 20.

In the above, since the shape of the product model prepared in the product design process in this way immediately determines the shape of the product 26, the release draft to be required in the casting process, i.e., the draft to be required to release the product 26 from the mold 24, must be formed or added to the product model in the product design process.

Figure 3:
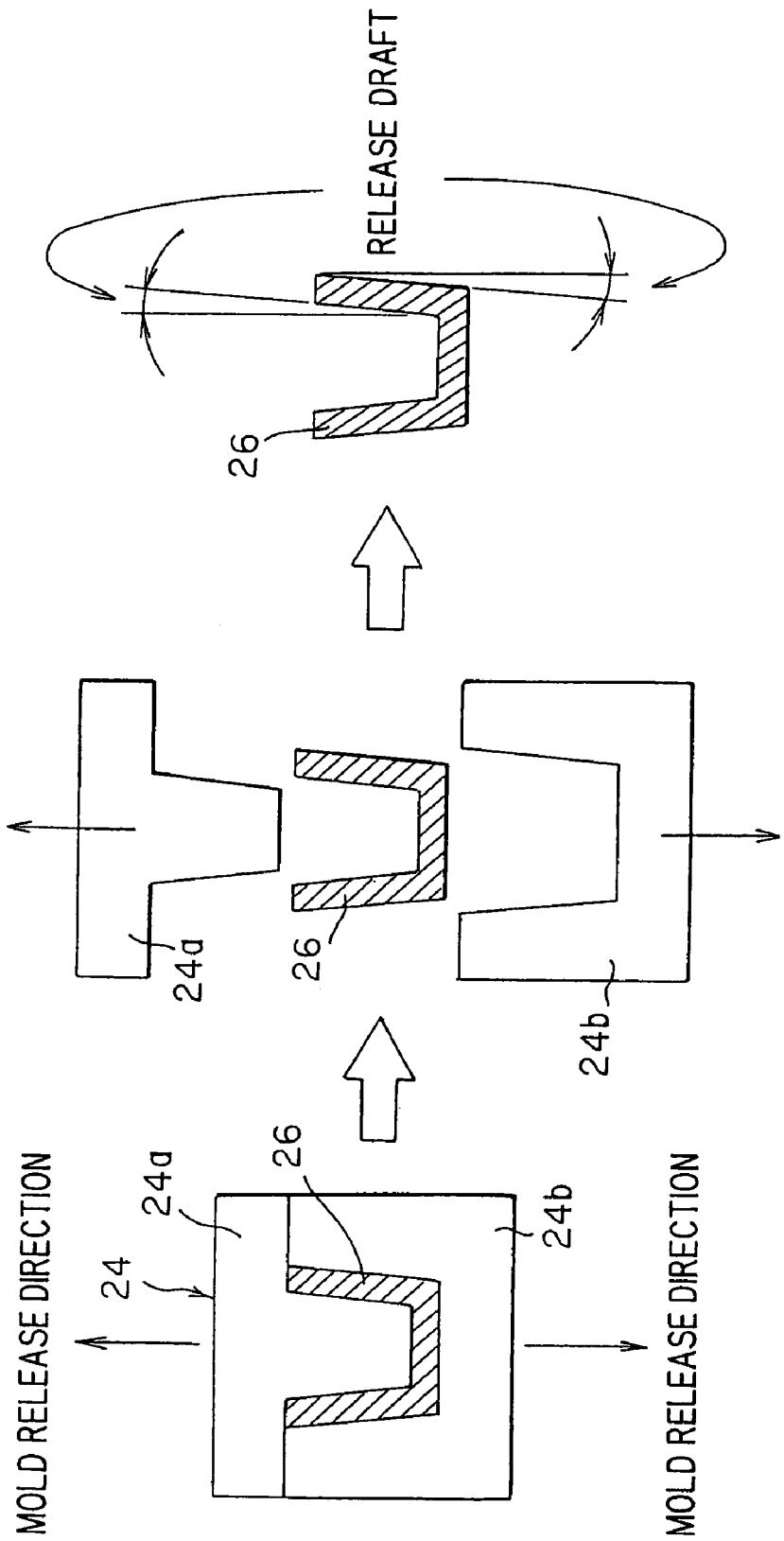
FIG. 3 is an explanatory view showing the product being released from the mold illustrated in FIG. 2.
Figure 4:
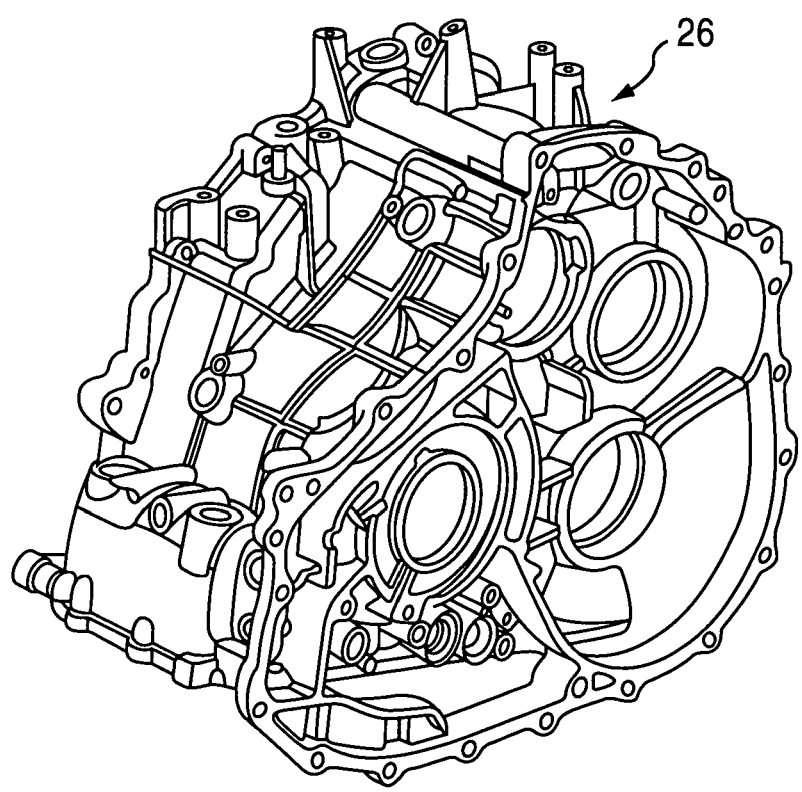
FIG. 4 is a perspective view showing a specific example of a product that the product design system illustrated in FIG. 1 is applied.

FIG. 3 is an explanatory view showing the mold release. Material is flowed in the space prescribed by an upper part (core) 24a and a lower part (cavity) 24b of the mold 24 to make the target product 26. In order to make it easier to release the product 26 from the mold at this time, the release draft should thus be formed. FIG. 3 shows a simplified product, however, the product 26 is actually given a complex uneven shape like that shown in FIG. 4. In the case of the example shown in FIG. 4, the product is a transmission case of a vehicle: In this case the mold shape becomes complex and the number of mold release directions is increased.

Figure 5:
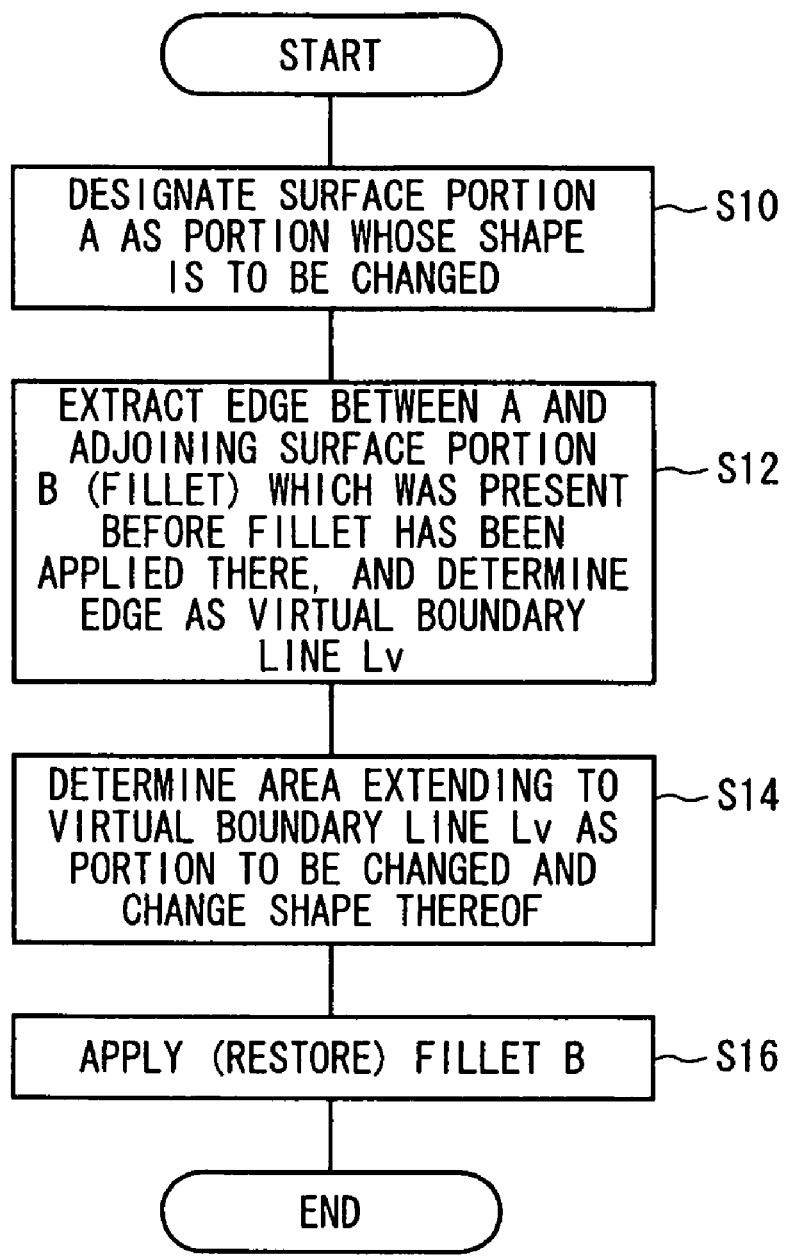
FIG. 5 is a flow chart showing the operation of the computer-aided product design system illustrated in FIG. 1.

FIG. 5 is a flow chart showing the operation of the computer-aided product design system 10 according to the embodiment of the invention.

As mentioned above, after the solid model has been completed to a desired shape with surfaces adjoined tangentially continuous by a fillet, there may be a need to change a portion of the model shape for a reason that the release draft is insufficient or the thickness is to be changed.

Figure 6:
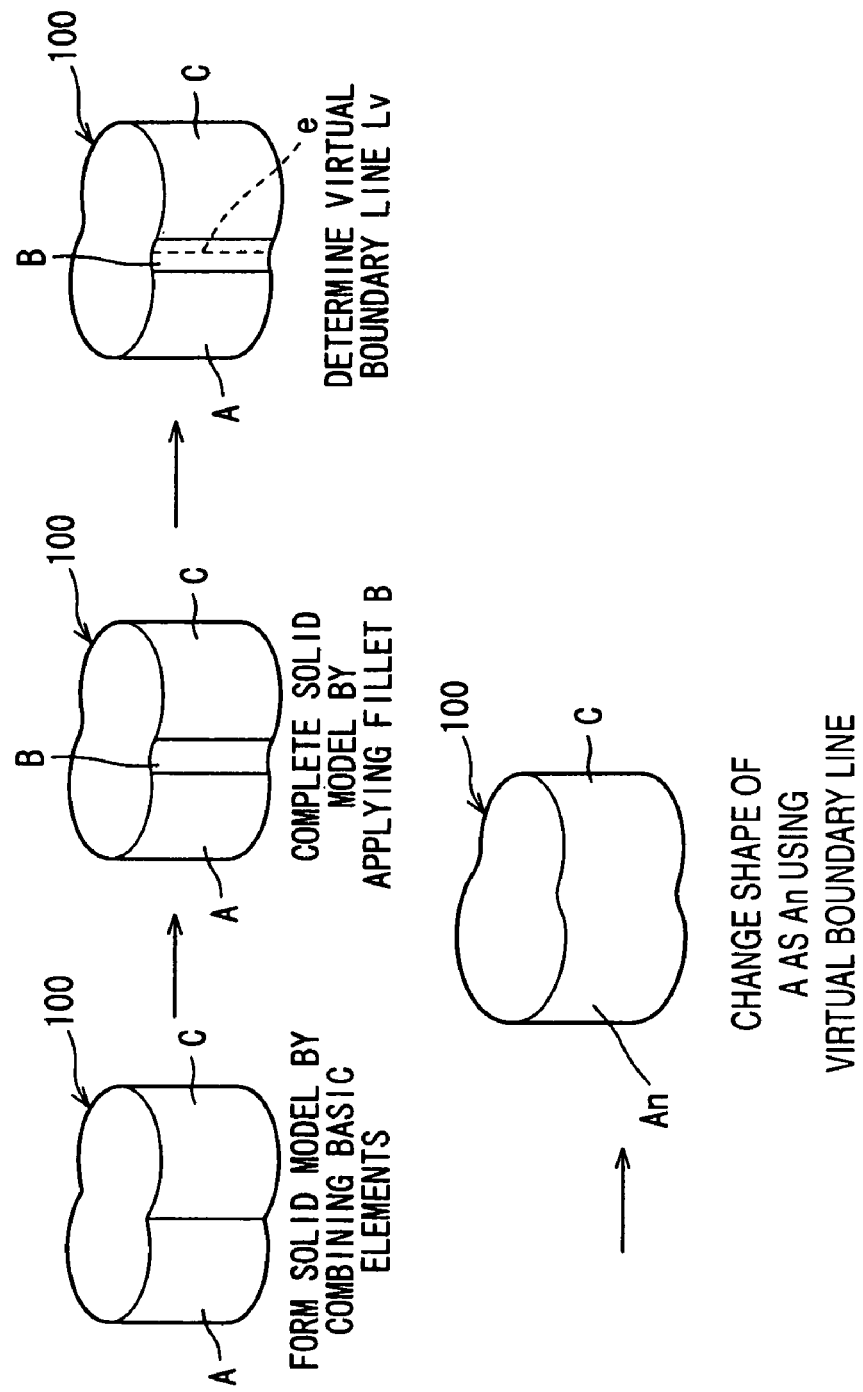
FIG. 6 is an explanatory view showing the operation of the product design system illustrated in FIG. 1 and explained in the flow chart in FIG. 5.

Explaining this with reference to FIG. 6, at first, two circular cylinders each having a rounded side surface (wall) A, C are combined to obtain the shape illustrated and then, a fillet B is applied to boundaries where the two side surfaces A, C meet and is completed as a solid model 100. In the solid model 100, the side surfaces A, C are tangentially continuous by the fillet B, in other words, A and C lost the independence as a surface and become portions of surface. Since B is a fillet, it is also a portion of surface.

What will be discussed in this embodiment is that, in the solid model 100, it is supposed that A is selected as the portion to be changed (increased or decreased in shape) relative to C. The solid model 100 will be the whole or a part of the product model 20.

The operation of the system will be explained with reference to the flow chart of FIG. 5.

The program begins in S10 in which A is designated as the portion of surface to be changed in its shape and proceeds to S12 in which an edge e (at which the former side surfaces A, C intersect and which was present until the fillet B is applied there) is extracted as a virtual boundary line Lv. In other words, the virtual boundary line Lv is formed.

The program then proceeds to S14 in which an area extending to the virtual boundary line Lv is determined to be the portion of surface A to be changed, and the shape of the portion of surface A is changed, and proceeds to S16 in which the fillet B is again applied (restored) at locations where new A (whose shape has been changed; now assigned with reference symbol An) and C intersect.

Figure 7:
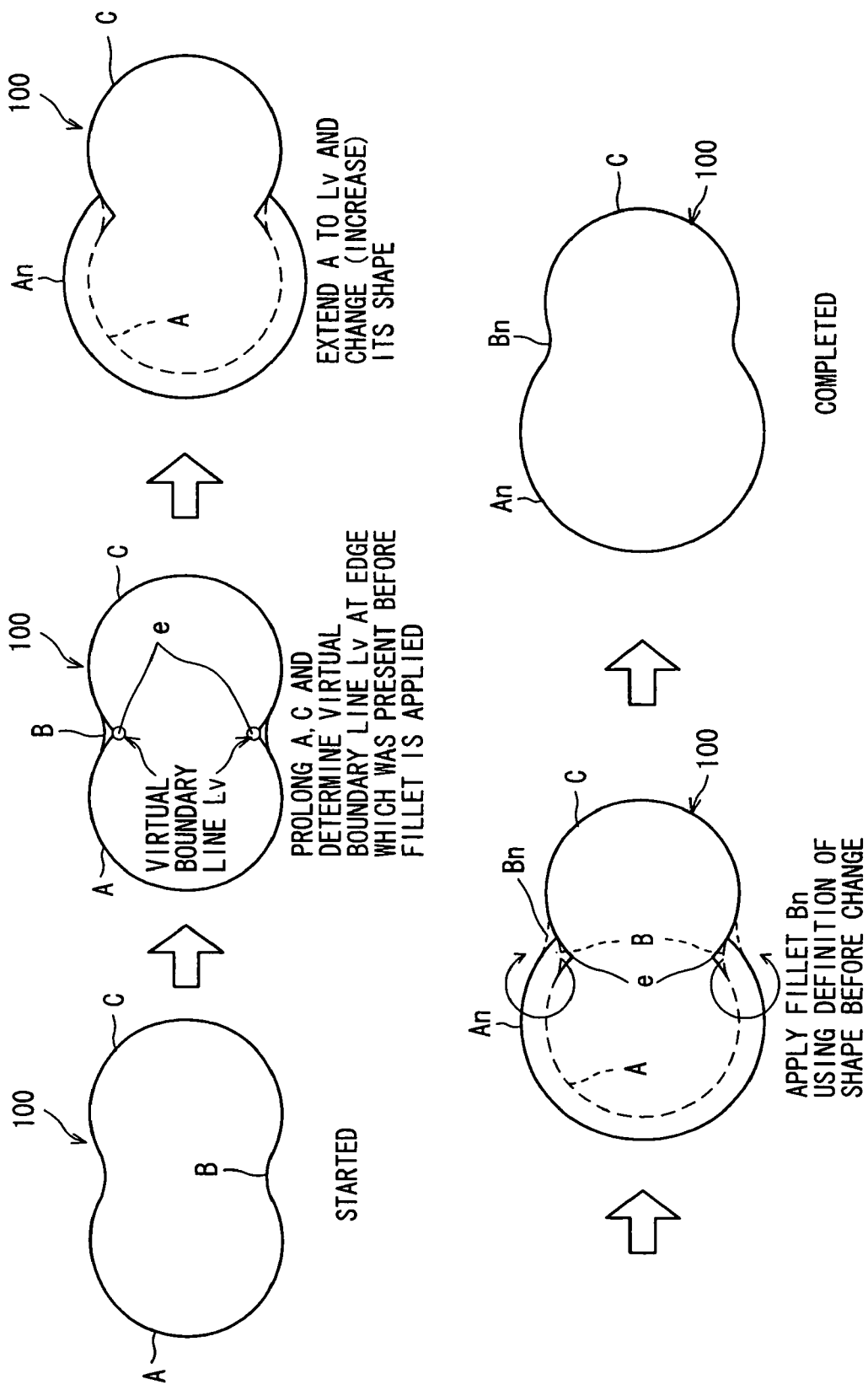
FIG. 7 is an explanatory view similarly showing the operation of the product design system illustrated in FIG. 1 and explained in the flow chart in FIG. 5.

Specifically, as illustrated in FIG. 7, the portions A and C are prolonged such that the virtual boundary line Lv are formed at the edge e on the prolonged lines. Then, A is prolonged to the virtual boundary line Lv and its shape is changed (increased). Then, the fillet B (now assigned with new symbol Bn) is again applied (restored) using the definition of shape before change. In this way, the shape of A can be easily change by utilizing the definition of shape of A before subjected to change, for example, by multiplying the former definition of shape of A by n. The same will also be applied to the restoration of the fillets B.

The above processing corresponds to hid a step (which would otherwise occur by the shape change) by a portion which has been adjoined before change, thereby enabling to utilize the definition of shape before change. With this, it becomes possible to improve the efficiency of design and in addition, to enhance the degree of freedom of design.

It should be noted that, in order to enable the computer 12 to achieve this shape change processing, the computer 12 must recognize that A, B and C (which are tangentially continuous) can be divided into the three portions in the solid model 100. Specifically, one of the following condition must be satisfied for achieving the processing:

(1) B is recognized as a fillet applied by fillet-applying function in the program 16;
(2) B is formed later than A, C by the Boolean set operations, etc.;
(3) elements (such as curves) for forming A, B, C are divided beforehand, i.e., set to be independently; and
(4) the curvature remains unchanged throughout B, but the curvature varies definitely at A and C, such that B can be separated form A, C from the location where the curvature begins to vary.

The example shown in FIGS. 6 and 7 can satisfies the condition mentioned in (1). Accordingly, the shape of A can be easily changed by utilizing the definition of shape before change. Any one of the condition must similarly be satisfied in a second embodiment and on.

Figure 8:
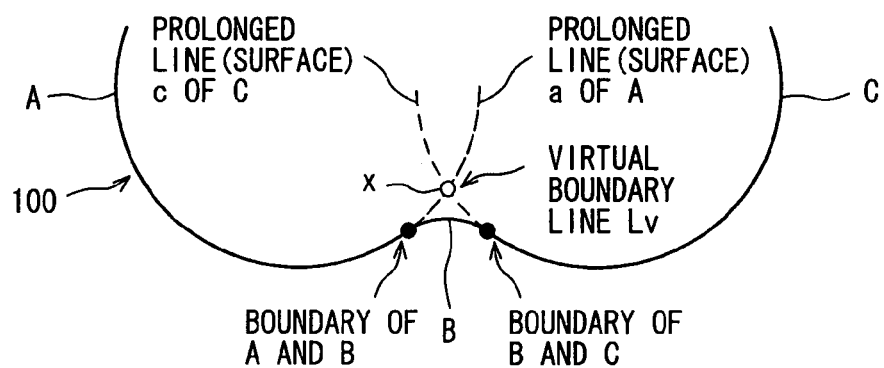
FIG. 8 is an explanatory view, partially similar to FIG. 7, but showing the operation of a computer-aided product design system according to a second embodiment of the invention.

FIG. 8 is an explanatory view, partially similar to FIG. 7, but showing the operation of a computer-aided product design system according to the second embodiment of the invention.

Different from the first embodiment where the virtual boundary line Lv is formed with the use of the edge present before the application of fillet, in the second embodiment, the virtual boundary line is obtained by prolonging curvature of A and C.

Specifically, since each of A and C is constituted as a curve (more precisely curved surface), the curves (curved surfaces) of A and C are prolonged towards the inside of the surfaces (solid model 100). More specifically, after deleting B, the curve (curved surface) constituting A is prolonged toward the inside of the solid model 100 with the same curvature of A to obtain a prolonged line (more precisely a prolonged surface) a, while that constituting C is prolonged in the same direction with the same curvature of C to obtain a prolonged line (more precisely a prolonged surface) c. Then, the virtual boundary line Lv is determined at a point of intersection x of the two prolonged lines a and c.

Then, the shape of A is increased (changed) in the same manner as that of the first embodiment. Then, a fillet is applied there.

It should be noted that in the second embodiment and on, it is assumed that B is not a filet, but is a portion of existing surface.

The rest of the second embodiment as well as the effects and advantages thereof is the same as those of the first embodiment.

Figure 9:
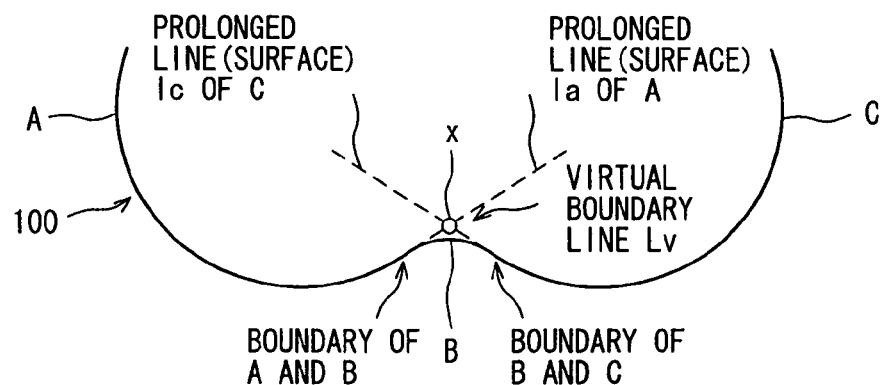
FIG. 9 is an explanatory view, partially similar to FIG. 7, but showing the operation of a computer-aided product design system according to a third embodiment of the invention.

FIG. 9 is an explanatory view, partially similar to FIG. 7, but showing the operation of a computer-aided product design system according to a third embodiment of the invention.

In the third embodiment, the virtual boundary line is obtained by prolonging tangents of A and C.

Specifically, since each of A and C is constituted as a curve (more precisely curved surface), tangents (more precisely tangential surface) touching the curve (curved surface) constituting A is prolonged toward the inside of the solid model 100 (the inside of the surface) to obtain a prolonged line (more precisely a prolonged surface) la, while that touching the curve (curved surface) constituting C is prolonged in the same direction to obtain a prolonged line (more precisely a prolonged surface) lc. Then, the virtual boundary line Lv is determined at the point of intersection x of the two prolonged lines la and lc.

Then, the shape of A is increased (changed) in the same manner as that of the second embodiment. The rest of the third embodiment is the same as those of the second embodiment, and the effects and advantages thereof is the same as those of the first embodiment.

Figure 10:
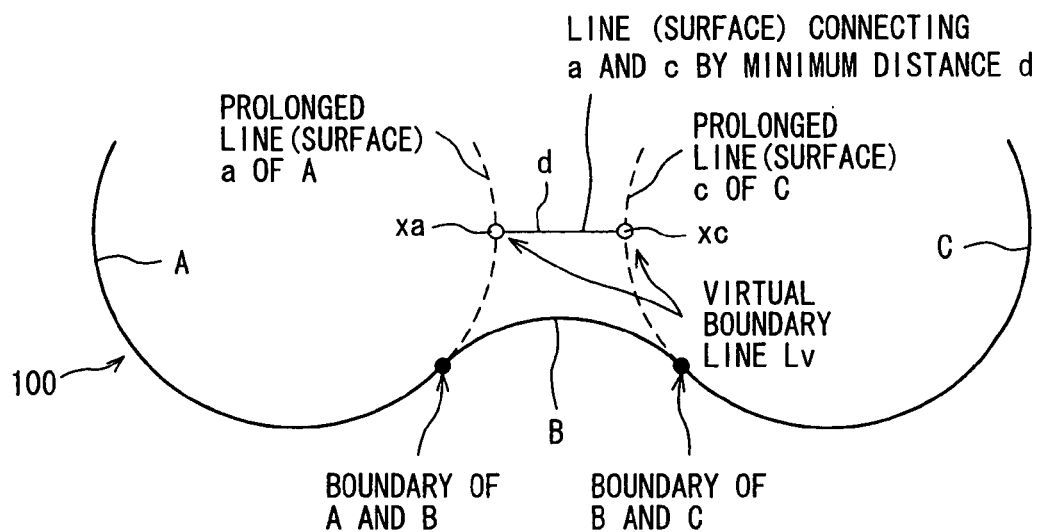
FIG. 10 is an explanatory view, partially similar to FIG. 7, but showing the operation of a computer-aided product design system according to a fourth embodiment of the invention.

FIG. 10 is an explanatory view, partially similar to FIG. 7, but showing the operation of a computer-aided product design system according to a fourth embodiment of the invention.

In the fourth embodiment, the virtual boundary line is obtained by determining positions connecting the prolonging lines from A and C by a minimum distance.

Specifically, since each of A and C is constituted as a curve (more precisely curved surface), the curve (curved surface) constituting A is prolonged toward the inside of the solid model 100 with the same curvature of A to obtain the prolonged line a, while that constituting C is prolonged in the same direction with the same curvature of C to obtain the prolonged line c.

Then, positions or locations connecting the prolonged lines a and c by a minimum (in absolute value) distance d is determined and each of the positions xa, xc thus determined is determined to be the virtual boundary line Lv. In this way, two virtual boundary line are formed in the fourth embodiment.

Figure 11:
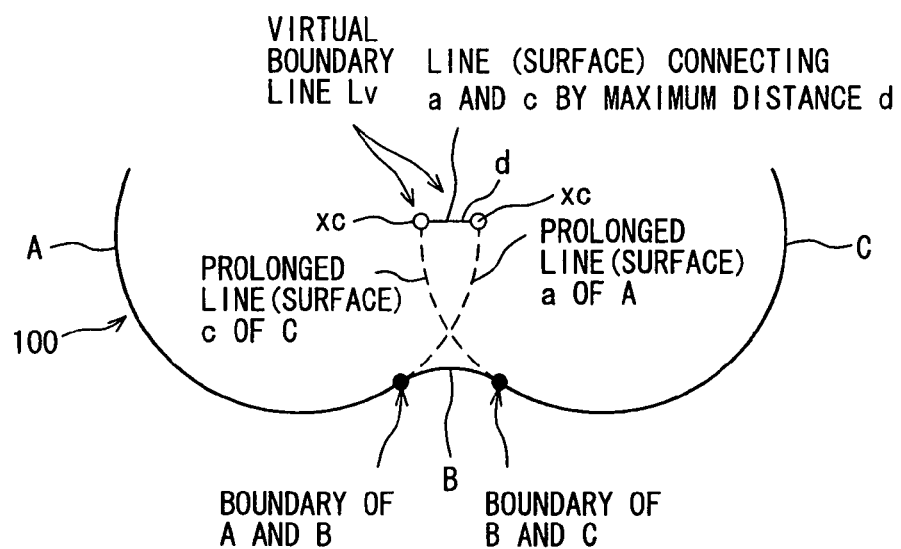
FIG. 11 is an explanatory view, partially similar to FIG. 7, but showing the operation of a computer-aided product design system according to a fifth embodiment of the invention.

The rest of the fourth embodiment is the same as those of the second embodiment, and the effects and advantages thereof is the same as those of the first embodiment FIG. 11 is an explanatory view, partially similar to FIG. 7, but showing the operation of a computer-aided product design system according to a fifth embodiment of the invention.

In the fifth embodiment, the virtual boundary line is obtained by determining the positions connecting the prolonging lines from A and C by a maximum distance.

Specifically, since each of A and C is constituted as a curve (more precisely curved surface), the curve (curved surface) constituting A is prolonged toward the inside of the solid model 100 with the same curvature of A to obtain the prolonged line a, while that constituting C is prolonged in the same direction with the same curvature of C to obtain the prolonged line c.

Then, positions or locations connecting the prolonged lines a and c by a maximum (in absolute value) distance d is determined and each of the positions xa, xc thus determined is determined to be the virtual boundary line Lv. Like the fourth embodiment, two virtual boundary line are formed in the fifth embodiment.

In the fifth embodiment, since the prolonged line intersect in the inside of the surfaces (solid model 100) and the distance d becomes negative value, the positions defining the distance d becomes maximum in absolute value are each determined to be the virtual boundary line Lv.

Figure 12:
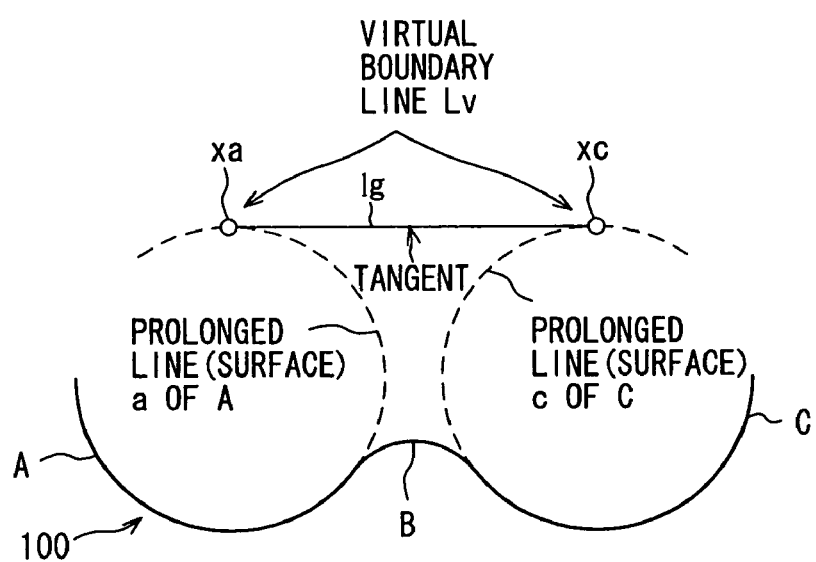
FIG. 12 is an explanatory view, partially similar to FIG. 7, but showing the operation of a computer-aided product design system according to a sixth embodiment of the invention.
Figure 13:
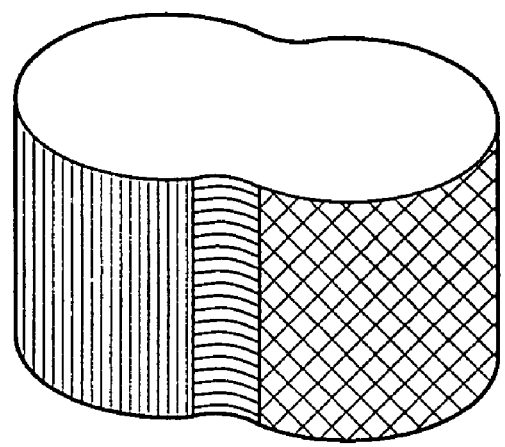
FIG. 13 is an explanatory view showing the operation of a product design system of the prior art.
Figure 14:
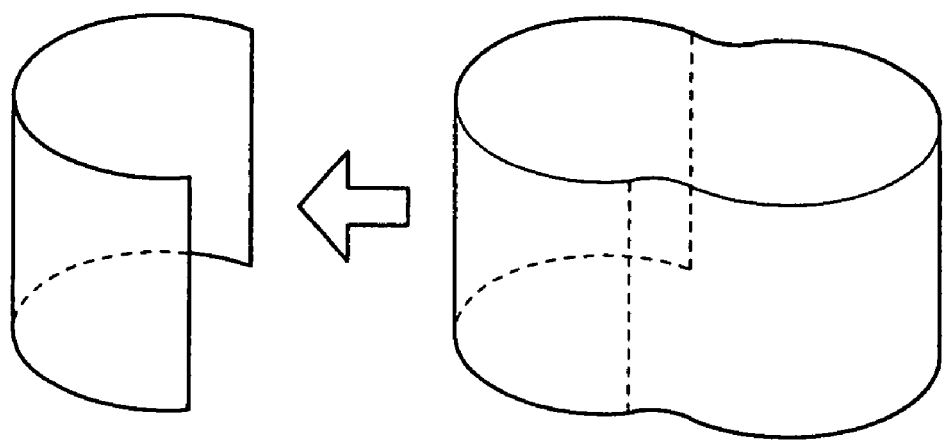
FIG. 14 is an explanatory view similarly showing the operation of a product design system of the prior art.

The rest of the fifth embodiment is the same as those of the fourth embodiment, and the effects and advantages thereof is the same as those of the first embodiment FIG. 12 is an explanatory view, partially similar to FIG. 7, but showing the operation of a computer-aided product design system according to a sixth embodiment of the invention.

In the sixth embodiment, the virtual boundary line is obtained by determining a point of contact on a line touching A and C.

Specifically, since each of A and C is constituted as a curve (more precisely curved surface), the curve (curved surface) constituting A is prolonged toward the inside of the solid model 100 with the same curvature of A to obtain the prolonged line a, while that constituting C is prolonged in the same direction with the same curvature of C to obtain the prolonged line c.

Then, a line (more precisely a surface) lg is drawn by the designer (engineer) and the positions or locations xa, xc is determined form points of contact of the line with the prolonged lines a and c, and each of the positions xa, xc thus determined is determined to be the virtual boundary line Lv. Like the fourth embodiment, two virtual boundary line are formed in the fifth embodiment.

The rest of the sixth embodiment is the same as those of the fourth embodiment, and the effects and advantages thereof is the same as those of the first embodiment The first to sixth embodiments are thus configured to have a system (10) for designing a product (26) having at least a computer (12), a display (14) connected to the computer for displaying result of processing of the computer, an input device (18) connected to the computer for allowing an engineer to enter data and an interactive program (16), stored in the computer, for aiding the engineer to design the product through the display and the input device, the program having a shape modelling function and including at least: product design process for allowing the engineer to design a product model (20) by modelling the product by a geometric model (100) comprising a combination of basic elements through the shape modelling function; and mold design process for allowing the engineer to design a mold (24) for producing the product based on the designed product model (20). In the system, the characteristic features are that the program (16) of the product design process comprising; virtual boundary line determining means (S10, S12) for determining a virtual boundary line between a portion of surface (A) and rest (C) of the geometric model (100), when a shape of the portion of surface of the geometric model is to be changed; area determining means (S14) for determining an area extending to the virtual boundary line as the portion of surface whose shape is to be changed; and shape changing means (S14) for changing the shape of the portion using a definition of shape of the portion.

Specifically, as illustrated in FIGS. 6 and 7, in a case that the portion of surface (A) and the rest (C) of the geometric model (100) are connected by a fillet (B) such that the portion of surface and the rest of the solid model are tangentially continuous with each other, the virtual boundary line determining means determines the virtual boundary line at an edge which was present before the fillet (B) is applied.

Specifically, as illustrated in FIG. 8, in a case that the portion of surface (A) and the rest (C) of the geometric model (100) comprises curves, the virtual boundary line determining means prolongs each curve with a same curvature as that of each curve, and determines the virtual boundary line at a point of intersection (x) of the prolonged curves (a, c).

Specifically, as illustrated in FIG. 9, in a case that the portion of surface (A) and the rest (C) of the geometric model (100) comprises curves, the virtual boundary line determining means prolongs tangents (la, lc) each touching the curves, and determines the virtual boundary line at a point of intersection (x) of the tangents (a, c).

Specifically, as illustrated in FIGS. 10 and 11, in a case that the portion of surface (A) and the rest (C) of the geometric model (100) comprises curves, the virtual boundary line determining means prolongs each curve with a same curvature as that of each curve, determines positions (xa, xc) on the prolonged curves (a, c) such that a distance (d) connecting the positions (xa, xc) is minimum or maximum in absolute value, and determines the virtual boundary line at each of the positions (xa, xc).

Specifically, as illustrated in FIG. 12, in a case that the portion of surface (A) and the rest (C) of the geometric model (100) comprises curves, the virtual boundary line determining means prolongs each curve with a same curvature as that of each curve, determines a line (lg) which contacts each curve, and determines the virtual boundary line at each of the points of contact (xa, xc).

Specifically, as illustrated in FIG. 7, there is provided with fillet applying means (S16) for applying a fillet between the portion of surface (A) and the rest (C) of the geometric model (100), and the fillet applying means applies the fillet using a definition of shape of a portion between the portion of surface (A) and the rest of (C) of the geometric model (100).

It should be noted in the above that, although the invention has been described taking the solid model as an example of the geometric model, the invention can be applied to other geometric model such as a wire-frame model.

It should also be noted that, although the invention has been described with reference to the case that the shape of a portion of curved surface of the solid model is to be changed, the invention can be applied to a case that shape of a portion of flat surface of the solid model is to be changed.

It should also be noted that, although the invention has been described with reference to the case that the shape of a surface portion of the solid model is increased, i.e., the surface portion A is increased with respect to the surface portion C, the invention can be applied to the case that a surface portion of the solid model is decreased.

The entire disclosure of Japanese Patent Application No. 2001-208857 filed on Jul. 10, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for designing a product having at least a computer, a display connected to the computer for displaying result of processing of the computer, an input device connected to the computer for allowing an engineer to enter data and an interactive program, stored in the computer, for aiding the engineer to design the product through the display and the input device, the program having a shape modelling function and including at least:

product design process for allowing the engineer to design a product model by modelling the product by a geometric model comprising a combination of basic elements through the shape modelling function; and mold design process for allowing the engineer to design a mold for producing the product based on the designed product model;

wherein the program of the product design process comprising;

virtual boundary line determining means for determining a virtual boundary line between a portion of surface and rest of the geometric model, when a shape of the portion of surface of the geometric model is to be changed;

area determining means for determining an area extending to the virtual boundary line as the portion of surface whose shape is to be changed; and shape changing means for changing the shape of the portion using a definition of shape of the portion, wherein, in a case that the portion of surface and the rest of the geometric model comprises curves, the virtual boundary line determining means prolongs each curve with a same curvature as that of each curve, determines positions on the prolonged curves such that a distance connecting the positions is minimum or maximum in absolute value, and determines the virtual boundary line at each of the positions.

2. The system according to claim 1, wherein, in a case that the portion of surface and the rest of the geometric model are connected by a fillet such that the portion of surface and the rest of the solid model are tangentially continuous with each other, the virtual boundary line determining means determines the virtual boundary line at an edge which was present before the fillet is applied.

3. The system according to claim 1, wherein, in a case that the portion of surface and the rest of the geometric model comprises curves, the virtual boundary line determining means prolongs each curve with a same curvature as that of each curve, and determines the virtual boundary line at a point of intersection (x) of the prolonged curves.

4. The system according to claim 1, wherein, in a case that the portion of surface and the rest of the geometric model comprises curves, the virtual boundary line determining means prolongs tangents each touching the curves, and determines the virtual boundary line at a point of intersection of the tangents.

5. The system according to claim 1, further including;

fillet applying means for applying a fillet between the portion of surface and the rest of the geometric model.

6. The system according to claim 5, wherein the fillet applying means applies the fillet using a definition of shape of a portion between the portion of surface and the rest of the geometric model.

7. A system for designing a product having at least a computer, a display connected to the computer for displaying result of processing of the computer, an input device connected to the computer for allowing an engineer to enter data and an interactive program, stored in the computer, for aiding the engineer to design the product through the display and the input device, the program having a shape modelling function and including at least:

product design process for allowing the engineer to design a product model by modelling the product by a geometric model comprising a combination of basic elements through the shape modelling function; and mold design process for allowing the engineer to design a mold for producing the product based on the designed product model;

wherein the program of the product design process comprising;

virtual boundary line determining means for determining a virtual boundary line between a portion of surface and rest of the geometric model, when a shape of the portion of surface of the geometric model is to be changed;

area determining means for determining an area extending to the virtual boundary line as the portion of surface whose shape is to be changed; and shape changing means for changing the shape of the portion using a definition of shape of the portion, wherein, in a case that the portion of surface and the rest of the geometric model comprises curves, the virtual boundary line determining means prolongs each curve with a same curvature as that of each curve, determines a line which contacts each curve, and determines the virtual boundary line at each of the points of contact.

8. The system according to claim 7, wherein, in a case that the portion of surface and the rest of the geometric model are connected by a fillet such that the portion of surface and the rest of the solid model are tangentially continuous with each other, the virtual boundary line determining means determines the virtual boundary line at an edge which was present before the fillet is applied.

9. The system according to claim 7, wherein, in a case that the portion of surface and the rest of the geometric model comprises curves, the virtual boundary line determining means prolongs each curve with a same curvature as that of each curve, and determines the virtual boundary line at a point of intersection (x) of the prolonged curves.

10. The system according to claim 7, wherein, in a case that the portion of surface and the rest of the geometric model comprises curves, the virtual boundary line determining means prolongs tangents each touching the curves, and determines the virtual boundary line at a point of intersection of the tangents.

11. The system according to claim 7, further including;
fillet applying means for applying a fillet between the portion of surface and the rest of the geometric model.

12. The system according to claim 11, wherein the fillet applying means applies the fillet using a definition of shape of a portion between the portion of surface and the rest of the geometric model.

13. A method of designing a product having at least a computer, a display connected to the computer for displaying result of processing of the computer, an input device connected to the computer for allowing an engineer to enter data and an interactive program, stored in the computer, for aiding the engineer to design the product through the display and the input device, the program having a shape modelling function and including at least:
product design process for allowing the engineer to design a product model by modelling the product by a geometric model comprising a combination of basic elements through the shape modelling function; and
mold design process for allowing the engineer to design a mold for producing the product based on the designed product model;
wherein the program of the product design process comprising the steps of;
determining a virtual boundary line between a portion of surface and rest of the geometric model, when a shape of the portion of surface of the geometric model is to be changed;
determining an area extending to the virtual boundary line as the portion of surface whose shape is to be changed; and
changing the shape of the portion using a definition of shape of the portion,
wherein, in a case that the portion of surface and the rest of the geometric model comprises curves, the virtual boundary line determining step prolongs each curve with a same curvature as that of each curve, determines positions on the prolonged curves such that a distance connecting the positions is minimum or maximum in absolute value, and determines the virtual boundary line at each of the positions.

14. The method according to claim 13, wherein, in a case that the portion of surface and the rest of the geometric model are connected by a fillet such that the portion of surface and the rest of the solid model are tangentially continuous with each other, the virtual boundary line determining step determines the virtual boundary line at an edge which was present before the fillet is applied.

15. The method according to claim 13, wherein, in a case that the portion of surface and the rest of the geometric model comprises curves, the virtual boundary line determining step prolongs each curve with a same curvature as that of each curve, and determines the virtual boundary line at a point of intersection (x) of the prolonged curves.

16. The method according to claim 13, wherein, in a case that the portion of surface and the rest of the geometric model comprises curves, the virtual boundary line determining step prolongs tangents each touching the curves, and determines the virtual boundary line at a point of intersection of the tangents.

17. The method according to claim 13, further including the step of;
applying a fillet between the portion of surface and the rest of the geometric model.

18. The method according to claim 17, wherein the fillet applying step applies the fillet using a definition of shape of a portion between the portion of surface and the rest of the geometric model.

19. The method according to claim 17, wherein the fillet applying step applies the fillet using a definition of shape of a portion between the portion of surface and the rest of the geometric model.

20. A method of designing a product having at least a computer, a display connected to the computer for displaying result of processing of the computer, an input device connected to the computer for allowing an engineer to enter data and an interactive program, stored in the computer, for aiding the engineer to design the product through the display and the input device, the program having a shape modelling function and including at least:
product design process for allowing the engineer to design a product model by modelling the product by a geometric model comprising a combination of basic elements through the shape modelling function; and
mold design process for allowing the engineer to design a mold for producing the product based on the designed product model;
wherein the program of the product design process comprising the steps of;
determining a virtual boundary line between a portion of surface and rest of the geometric model, when a shape of the portion of surface of the geometric model is to be changed;
determining an area extending to the virtual boundary line as the portion of surface whose shape is to be changed; and
changing the shape of the portion using a definition of shape of the portion,
wherein, in a case that the portion of surface and the rest of the geometric model comprises curves, the virtual boundary line determining step prolongs each curve with a same curvature as that of each curve, and determines a line which contacts each curve, and determines the virtual boundary line at each of the points of contact.

21. The method according to claim 20, wherein, in a case that the portion of surface and the rest of the geometric model are connected by a fillet such that the portion of surface and the rest of the solid model are tangentially continuous with each other, the virtual boundary line determining step determines the virtual boundary line at an edge which was present before the fillet is applied.

22. The method according to claim 20, wherein, in a case that the portion of surface and the rest of the geometric model comprises curves, the virtual boundary line determining step prolongs each curve with a same curvature as that of each curve, and determines the virtual boundary line at a point of intersection (x) of the prolonged curves.

23. The method according to claim 20, wherein, in a case that the portion of surface and the rest of the geometric model comprises curves, the virtual boundary line determining step prolongs tangents each touching the curves, and determines the virtual boundary line at a point of intersection of the tangents.

24. The method according to claim 20, further including the step of;
applying a fillet between the portion of surface and the rest of the geometric model.

* * * * *